US008107321B2

(12) United States Patent
Képesi et al.

(10) Patent No.: US 8,107,321 B2
(45) Date of Patent: Jan. 31, 2012

(54) JOINT POSITION-PITCH ESTIMATION OF ACOUSTIC SOURCES FOR THEIR TRACKING AND SEPARATION

(75) Inventors: Marián Képesi, Dunajská Streda (SK); Michael Wohlmayr, Graz (AT); Gernot Kubin, Graz (AT)

(73) Assignee: Technische Universitat Graz and Forschungsholding Tu Graz GmbH, Graz (AT)

( * ) Notice: Subject to any disclaimer, the term of this patent is extended or adjusted under 35 U.S.C. 154(b) by 244 days.

(21) Appl. No.: 12/602,640

(22) PCT Filed: Jun. 1, 2007

(86) PCT No.: PCT/AT2007/000265
§ 371 (c)(1),
(2), (4) Date: Jan. 19, 2010

(87) PCT Pub. No.: WO2008/144784
PCT Pub. Date: Dec. 4, 2008

(65) Prior Publication Data
US 2010/0142327 A1 Jun. 10, 2010

(51) Int. Cl.
*G01S 3/80* (2006.01)
(52) U.S. Cl. ......................................... 367/125; 367/124
(58) Field of Classification Search .................. 367/124, 367/125
See application file for complete search history.

(56) References Cited

U.S. PATENT DOCUMENTS

| | | | | |
|---|---|---|---|---|
| 5,175,710 A | * | 12/1992 | Hutson | 367/135 |
| 6,226,606 B1 | | 5/2001 | Acero et al. | |
| 2001/0031053 A1 | * | 10/2001 | Feng et al. | 381/92 |
| 2003/0088401 A1 | * | 5/2003 | Terez | 704/207 |
| 2003/0112983 A1 | * | 6/2003 | Rosca et al. | 381/103 |
| 2005/0143983 A1 | * | 6/2005 | Chang et al. | 704/218 |
| 2005/0249038 A1 | | 11/2005 | Rui et al. | |
| 2005/0271300 A1 | * | 12/2005 | Pina | 382/294 |
| 2006/0153283 A1 | * | 7/2006 | Scharf et al. | 375/148 |
| 2007/0036360 A1 | * | 2/2007 | Breebaart | 381/23 |

OTHER PUBLICATIONS

Benesty, J.; Jingdong Chen; Yiteng Huang; , "Time-delay estimation via linear interpolation and cross correlation," Speech and Audio Processing, IEEE Transactions on , vol. 12, No. 5, pp. 509-519, Sep. 2004.*
Aarts, R.M.; Irwan, R.; Janssen, A.J.E.M.; , "Efficient tracking of the cross-correlation coefficient," Speech and Audio Processing, IEEE Transactions on , vol. 10, No. 6, pp. 391-402, Sep. 2002.*

* cited by examiner

*Primary Examiner* — Thomas Tarcza
*Assistant Examiner* — James Hulka
(74) *Attorney, Agent, or Firm* — Sutherland Asbill & Brennan LLP

(57) ABSTRACT

The invention relates to a method for localizing and tracking acoustic sources (101) in a multi-source environment, comprising the steps of recording audio-signals (103) of at least one acoustic source (101) with at least two recording means (104, 105), creating a two- or multi-channel recording signal, partitioning said recording signal into frames of predefined length (N), calculating for each frame a cross-correlation function as a function of discrete time-lag values ($\tau$) for channel pairs (106, 107) of the recording signal, evaluating the cross-correlation function by calculating a sampling function depending on a pitch parameter ($f_0$) and at least one spatial parameter ($\phi_0$), the sampling function assigning a value to every point of a multidimensional space being spanned by the pitch-parameter and the spatial parameters, and identifying peaks in said multidimensional space with respective acoustic sources in the multi-source environment.

20 Claims, 3 Drawing Sheets

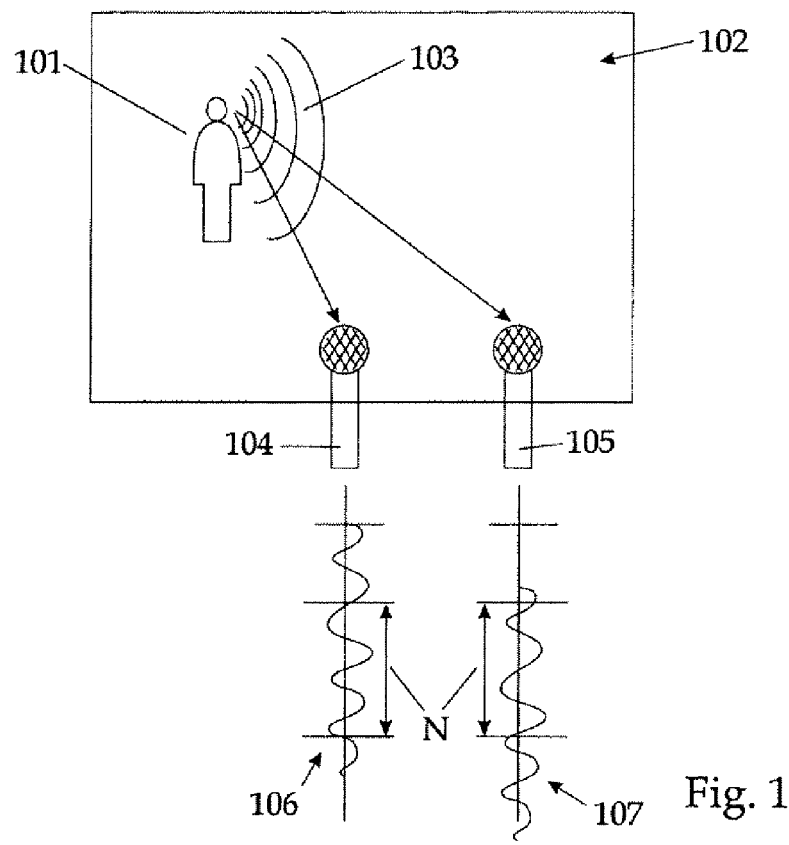
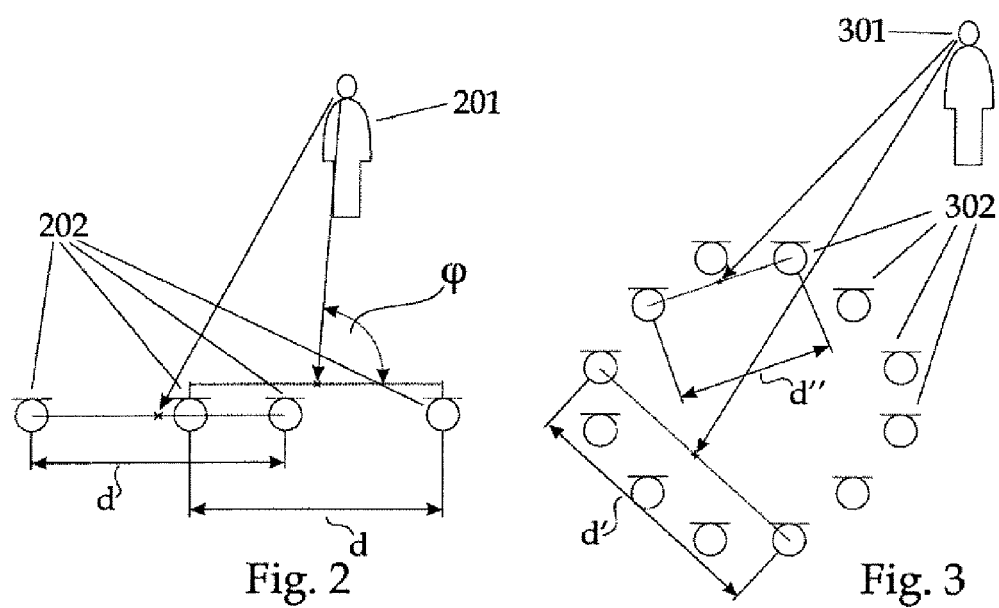
Fig. 1
Fig. 2
Fig. 3

JOINT POSITION-PITCH ESTIMATION OF ACOUSTIC SOURCES FOR THEIR TRACKING AND SEPARATION

FIELD OF THE INVENTION AND DESCRIPTION OF PRIOR ART

The present invention relates to a method for localizing and tracking acoustic sources in a multi-source environment, comprising the steps of (a) recording audio-signals of at least one acoustic source with at least two recording means and creating a two- or multi-channel recording signal, (b) partitioning said recording signal into frames of predefined length, (c) calculating for each frame a cross-correlation function as a function of discrete time-lag values for channel pairs of the recording signal, and in further steps evaluating the cross-correlation function in such a way, that tracking information about the acoustic sources can be extracted from the cross-correlation function.

The localization and identification of acoustic sources in multi-source environments is a matter of great interest in the signal processing community, e.g. for speaker tracking and multi-party speech segmentation.

Most techniques for determining the location of an acoustic source rely on estimation of the direction of arrival (DoA) of the audio signal of the source. In algorithms of that kind the estimation of source location is based on a signal time difference of arrival (TDOA) among microphones, which allows for rough conclusions on the source position using geometric considerations. To this end such techniques employ microphone arrays, using, rather than just the acoustic data received by the microphone arrays, the time delays of the arrival of the audio signal at each sensor. The microphones used for this technique are typically omni-directional, which means that they do not exhibit any selectivity to a specific direction in space. To simplify matters, it is often assumed that the sources of the acoustic scene have sufficient distance to the microphone array such that their incoming waveforms can be modeled to be planar. This so called far-field assumption is valid in many cases.

Examples of solutions using the TDOA-approach are described in "*Talker localization and speech recognition using a microphone array and a cross-powerspectrum phase analysis*" by D. Giuliani, M. Omologo and P. Svaizer, (IC-SLP. 1994, pp. 1242-1246), "*A practical methodology for speech localization with microphone arrays*" by M. Brandstein and H. Silverman (Technical Report, Brown University, Nov. 13, 1996) and the US 2005/0249038 A1.

One of the easiest approaches for source identification is based on pitch-tracking. The term pitch refers here to the fundamental frequency of a quasi-periodic structure in the short-time spectrum of a speech signal. The pitch is one of the various characteristics of human speech, created by the vocal chords of a speaker during voiced portions of speech. The pitch in human speech appears in the speech signal as a nearly repeating wave form. The period between the nearly repeating waveforms determines the pitch. Following common practice, the term pitch is used for the fundamental frequency throughout the whole document.

Pitch tracking is not only important for coding or compression, but has been successfully implemented into recent speech recognition algorithms to find word boundaries, improve parsing and to find the focus of a sentence through stressed words. Pitch-guided segregation strategies can be used to separate, and subsequently identify, simultaneous sounds. Common solutions for pitch-tracking employ the auto-correlation technique wherein one portion of the signal is compared to its shifted versions. The U.S. Pat. No. 6,226,606 B1 discloses one application of aforementioned technique in addition to numerous further approaches for tackling the problem of pitch estimation.

Much effort has been invested to improve the methods for localizing and identifying acoustic sources, however results are only elementary, though promising. Still, most of the existing algorithms either assume uncorrelated noise or ignore room reverberation. It has been found that testing on data with uncorrelated noise and no reverberation will almost always give perfect results. But the algorithms would not work well in real-world situations.

While much effort has been invested in improving source localization algorithms like TDOA as well as pitch tracking techniques, up to now only elementary attempts have been made to combine these mechanisms. Independent estimation of the two quantities kept tracking and separation of multiple sources as an ambiguous and still unsolved problem for real acoustic environments.

A simultaneous treatment of pitch and delay is presented in "*Recurrent timing neural networks for joint F0-localisation based speech separation*" by Stuart Wrigley and Guy Brown (ICASSP 2007). In their paper they describe improvements of a neuro-computational model for stimulus separation. They therein use recurrent timing neural networks (RTNN) with coincidence detectors, wherein one input is an incoming stimulus and the other input derives from a recurrent delay line. The paper proposes a combination of a layer of such coincidence-detectors with a two-dimensional set of recurrent timing neural networks, the coincidence-detector layer being provided for detecting the interaural time difference (ITD) of an audio signal, the recurrent timing neural networks analyzing the pitch of such a signal. Each coincidence-detector is tuned to a particular ITD, and each such detector feeds excitation to a column of the RTNN-layer to determine the pitch of the signal. The resulting behavior allows for sources to be segregated on the basis of their separation in an ITD/pitch-space. This approach has the drawback of requiring a complex setup of RTNN-layers; moreover only a certain number of ITD-values and pitches can be analyzed since the recurrent delay lines of the coincidence detectors have to be adjusted accordingly. Furthermore this technique has only been used for source separation and does not allow for precise source localization.

SUMMARY OF THE INVENTION

It is an object of the present invention to provide an improved method for the indexing of acoustic sources by localization and identification of acoustic sources in a multi-source environment.

This aim is achieved by means of abovementioned method, comprising additional steps after steps (a) to (c): in a step (d) the cross-correlation function is evaluated by calculating a sampling function depending on a pitch parameter and at least one spatial parameter, the sampling function assigning a value to every point of a multidimensional space being spanned by the pitch-parameter and the spatial parameters, said sampling function being obtained by collecting values of the cross-correlation function for a set of discrete time-lag values determined for each point in the multidimensional space, and in a step (e) peaks are identified in said multidimensional space with respective acoustic sources in the multi-source environment.

This approach according to the invention enables the linking of pitch information of acoustic sources to spatial information. This makes it easy to track sources that do not produce continuous and consistent signals, such as speech, which always contains interruptions between words and sentences. The method makes use of the fact that in the cross-correlation function of two channels of a multi-channel audio signal, both pitch- and spatial-information of the acoustic source are encoded. The linked pitch information can easily be used as a leading parameter for spectral masking methods and frequency domain Independent Component Analysis (ICA) for blind source separation.

The invention provides a new representation for acoustic source indexing in a multi-source environment. This representation simplifies the analysis of the acoustic scene and facilitates new types of multi-source acoustic applications such as tracking, indexing and separation. The invention offers a basic representation for speaker tracking in multi-speaker environments, like meeting rooms and conference halls, to name only a few. Further, the invention is suitable for multimedia information retrieval, where not only tracking, but indexing and separation of acoustic sources is required.

By identifying peaks in the multidimensional space with respective acoustic sources, it is possible to track position and pitch in a joint way, i.e. the pitch value of each source can be linked to a spatial parameter of the source. This joint tracking assigns a pitch-based ID to each acoustic source, which can be used for many different problems: Position tracking algorithms can be reinitialized after a period of inactivity of an acoustic source by collecting a histogram of the pitch distribution from a given source ID and reassigning the pitch-based ID to a position by using a maximum likelihood method. Pitch tracking can be reinitialized after abrupt changes of pitch since the proposed method provides spatial information as an extra cue. A pitch tracking algorithm can be reinitialized by the new pitch value corresponding to the most probable position of the acoustic source at a given point in time.

In a further development of the invention, in step (a) of the method a plurality of pairs of recording means can be used for recording the audio signals of the acoustic sources. The width of the peaks that are identified in step (e) depends on the pitch stability, reverberation level and the length of the segment. Thus the provision of a plurality of recording means allows for amelioration of the method since more information about the acoustic sources can be obtained, using multiple pairs of microphones also increases the resolution and the performance of the method. It is possible to combine the signals from different recording means to selectively enhance the signal of interest.

In a variant of the invention, the recording means may be spatially arranged in a circular array. By virtue of this variant it is possible to get more precise spatial information for the acoustic sources. By selecting pairs of recording means from the circular array and cross-correlating their recording signals, it is possible to combine the information gained from the respective cross-correlation function to obtain coordinates for the position of the acoustic source instead of only knowing the angle-of-arrival of the signal.

In yet another variant of the invention, the recording means may be spatially arranged in a linear array. This arrangement has similar advantages like the circular array. However the invention is neither restricted to a linear nor a circular microphone array; rather, any other arrangements like L-shaped and T-shaped arrays are possible as well.

Advantageously, the recording of the audio-signals in step (a) is performed with recording means applying a sampling rate of at least 16 kHz and higher.

The partitioning of the recording signal in step (b) may preferably result in frames of a predefined length ranging from 20 to 200 ms. Provided the acoustic sources are immobile and their pitch remains quasi-constant, the predefined length of the frames may be above 1 s.

Depending on the acoustic scene being investigated, either length can be advantageous and allow for better results of the method (time resolution vs. pitch/position resolution).

In an advantageous embodiment of the invention, the cross-correlation function in step (c) is calculated using the equation $$R_1(\tau) = \sum_{n=-N/2}^{N/2} x_1(tN+n) \cdot x_2(tN+n+\tau)$$

wherein, $x_1$ and $x_2$ denote a first and a second channel of the recording signal respectively, t denotes a frame index, N denotes the length of the frame, and $\tau$ is the discrete time lag. For the sake of completeness it is mentioned that any cross-similarity measure can be used instead of the cross-correlation function from step (c), e.g. a generalized cross-correlation (GCC) or the average magnitude difference function (AMDF).

In order to allow for good results of the method according to the invention, the pitch-parameter of step (d) may be identified with the pitch of an acoustic source and/or one spatial parameter in step (d) may be identified with the angle-of-arrival of an acoustic source. By that means a decomposition of an one-dimensional recording signal into a multidimensional representation is possible, wherein one dimension is pitch and the other dimensions denote the location of the acoustic source. In the present case a two-dimensional representation is described, wherein one dimension is the pitch and the other dimension is the angle-of-arrival of the audio signal.

According to a preferred aspect of the invention, the sampling function of step (d) is calculated for a set of predefined values of the pitch parameter and the spatial parameters. Such a measure enables an accelerated analysis of the cross-correlation function, exemplarily pitch-parameters in the range of 50 to 500 Hz and angle-of-arrival candidates from 0 to 180°, with a step-size of 1 Hz and 1°, respectively, can be chosen.

Advantageously, the collecting of values of the cross-correlation function of step (d) comprises an operation chosen from the group of summation of values of the cross-correlation function, summation of the squares of values of the cross-correlation function and the product of values of the cross correlation function.

In a suitable aspect of the invention, for each point of the multidimensional space of step (d) the number of discrete time-lag values of the set of discrete time-lag values is determined by the number of correlation peaks of the cross-correlation function being considered, said number of correlation peaks depending on the pitch value under consideration. The number of correlation peaks in the cross-correlation function depends on the length of the frames the recording signal is partitioned in and on the pitch value under consideration. The more correlation peaks are considered, the more information is gained from the cross-correlation function.

Advantageously one spatial parameter is the angle-of-arrival of the audio signal and each of the time-lag values is determined for a peak of the cross-correlation function by the equation $\tau = k \cdot L_0(f_0) + O_0(\phi_0)$, wherein k is the number of the correlation peak in question, $L_0(f_0)$ is a first time lag depending on the pitch-parameter, calculated by dividing the sampling frequency $F_s$ by the pitch-parameter $f_0$ of the point in the multidimensional space the cross-correlation function is evaluated for, and $O_0(\phi_0)$ denotes a second time lag depending on the angle-of-arrival of the point in the multidimensional space the cross-correlation function is evaluated for, calculated with the equation $$O_0(\varphi_0) = \frac{d \cdot \cos(\varphi_0) \cdot F_s}{c},$$

wherein d denotes the distance between the recording means used for obtaining the channel pairs for the calculation of the cross-correlation function, $\phi_0$ denotes the angle of arrival (see FIG. 2) of the audio-signal as spatial parameter of the multi-dimensional space and c denotes the speed of sound in the propagation medium.

One possibility to calculate the sampling function of step (d) is represented by the equation $$\rho_t(\varphi_0, f_0) = b \cdot \sum_{k=-K}^{K} R_1(\lfloor k \cdot L(f_0) + O(\varphi_0) \rfloor),$$

wherein $\phi_0$ signifies the angle-of-arrival as a spatial parameter, $f_0$ denotes the pitch, b denotes a normalization factor and $R_t$ is the cross-correlation function, the time-lag value is rounded employing the floor function. The floor function is used to convert the arbitrary real numbers that might result for the time-Lag values to close integers. In a variant of the invention, instead of the floor function another rounding mechanism is employed in the above mentioned equation for the sampling function. The normalization factor b can be set equal to 1, another possibility would be to choose b as the reciprocal of the number of correlation peaks being considered. However, it is noted that these are only two of many possible formulations of the normalization factor, the normalization factor could even be dropped altogether. The sum in the above mentioned equation runs over a symmetric interval from –K to K, but it could also run from a specific correlation peak $-K_1$ to another peak $K_2$, in such a way creating an asymmetric interval. For the sake of completeness it is mentioned that it is even imaginable to skip the sum in the above-mentioned sampling function and replace it by any arithmetic operator like the product of all the values or with the sum of the squares of all these values.

If the computation is executed in the frequency domain, in step (d) the Fourier-transform of the cross-correlation function is calculated and the computation of the sampling function is conducted in the frequency domain.

In a variant of step (e) of the invention, a pitch parameter and at least one spatial parameter can be assigned to each acoustic source by identifying the peaks in the multidimensional parameter space with the acoustic sources. Thus a joint position-pitch tracking of acoustic sources is possible by means of the $(N_P+1)$-dimensional position-pitch space, with $N_P$ denoting the number of spatial dimensions, e.g. position parameters. In contrast to existing pitch extraction algorithms which ignore the multi-pitch nature of signals, this approach allows the retrieval of all periodic-like candidates present in the acoustic scene, well distinguishable by their position of excitation. It should be mentioned that when one pair of recording means is provided, producing a stereo-recording signal with two channels, the position of the acoustic source is represented by its angle-of-arrival. However, the use of a plurality of pairs of recording channels from microphones having some specific three dimensional arrangement in space allows to extract position coordinates of the acoustic sources by combining the results of multiple pairs of recording means.

In one particular application of the invention, the time-evolution of acoustic sources can be tracked by combining the results of a sequence of frames. Such a peak extraction could be effected by using a peak-picking method based on a basic multidimensional threshold method, for instance. From the position-pitch space all points with values above a given threshold are selected, and from each resulting cluster the maximum peak and its position is determined. In an optional step the peaks could be sorted according to their maximum values and the values could be displayed. The information about acoustic sources gained by the method according to the invention can be fed into various known source-tracking methods, source-localization methods and/or source-separation methods. Independent Component Analysis, beamforming and spectral masking are listed here as examples, however other methods are suitable as well.

BRIEF DESCRIPTION OF THE DRAWINGS

The specific features and advantages of the present invention will become better understood with regard to the following description. In the following, the present invention is described in more detail with reference to the drawings, which show:

FIG. 1 an experimental setup with an acoustic source and one pair of microphones, FIGS. 2 and 3 possible arrangements of recording devices, FIG. 4 an example of a cross-correlation function, FIG. 5 an exemplary view of a position-pitch plane, FIGS. 6a and 6b projections of the position-pitch plane of FIG. 5 onto its axes and FIG. 7 a flow diagram of the method according to the invention.

DETAILED DESCRIPTION OF THE INVENTION

Figure 4:
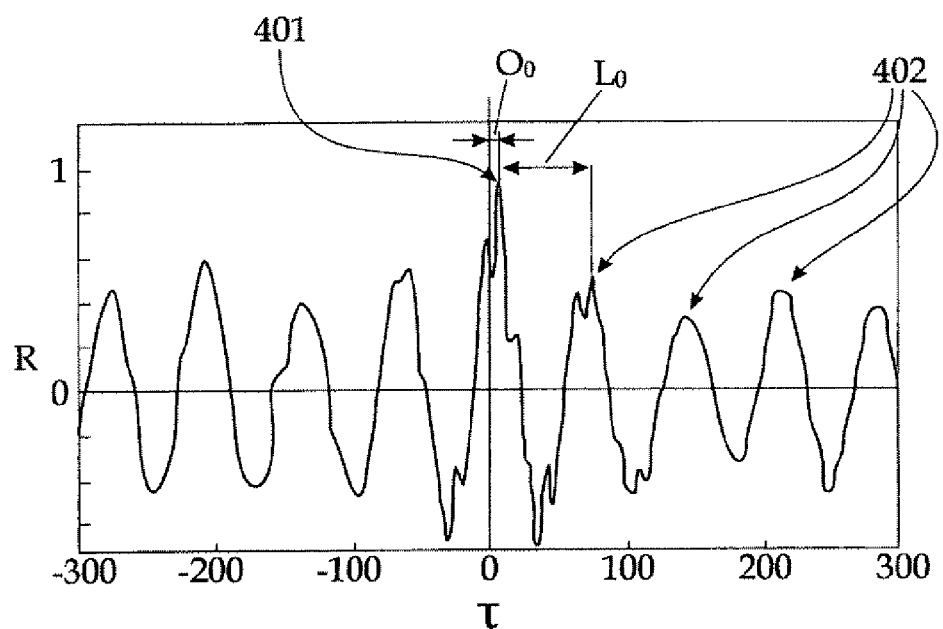

FIG. 1 shows a schematic setup for the application of a method according to the invention. For the sake of simplicity, only one acoustic source is depicted here. As already mentioned, the method is especially adapted to be used in a multi-source environment. A person 101 in a room 102 represents an acoustic source, emitting an audio signal 103. A linear array of two microphones 104, 105 is placed in the room 102 as recording means to record the audio signal 103. The microphones 104, 105 produce a two-channel recording signal, with a left channel 106 and a right channel 107, together forming a stereophonic audio signal. The more pairs of microphones are used, the better, however two microphones are enough to explain the principle of the method below.

FIGS. 2 and 3 show two possible arrangements of a plurality of recording means. FIG. 2 shows a speaker 201 and a linear array of microphones 202, the microphones 202 being grouped into pairs, the microphones of each pair having a distance d. The angle $\phi$, under which the audio signal of the speaker 201 arrives at one of the microphone pairs, can be determined from the audio signals recorded by the microphones. FIG. 3 shows a speaker 301 with a circular array of recording means, comprising 12 microphones 302. In an exemplary way, two pairs of microphones are depicted, with different respective distances d', d". If only one pair of recording means is used, the direction-of-arrival of an audio signal is determined from the angle-of-arrival. By combining the spatial information from multiple pairs of recording means it is possible to identify the location of acoustic sources more precisely. In principle, all possible pairs of microphones of such an array might be used. In the case of FIG. 3, the 12 circularly arranged microphones result in $$\binom{12}{2} = 66$$

different pairs.

In the present application a simplified case is presented, assuming far-field geometry and planar wave approximation. The far field is characterized by the assumption that the sources of the acoustic scene have sufficient distance to the microphone array so that their incoming waveforms can be modeled to be planar. Further it is noted that the following procedures are typically performed on a block by block basis where small blocks of audio data are simultaneously sampled from the sensor signals to produce a sequence of consecutive blocks of the signal data from each signal.

In FIG. 1, the microphones 104, 105 perform a continuous recording, but the signals are segmented into frames, each with a length of N. The length of the frames is usually between 20 and 200 ms, containing N sampling points. For each frame two channels of the recording signal are cross-correlated by means of a cross-correlation function $R_t(\tau)$ with the equation $$R_1(\tau) = \sum_{n=-N/2}^{N/2} x_L(tN+n) \cdot x_R(tN+n+\tau), \quad (1)$$

wherein N is the length of the analyzed frame, n is discrete time, $\tau$ is the discrete time-lag for which the cross-correlation function is calculated and t is the index of the frame. $x_L$ denotes the left channel 106, i.e. the signal recorded by the left microphone 104, $x_R$ signifies the right channel 107, in this case the signal recorded by the right microphone 105. The cross-correlation function is calculated for different discrete time-lag values $\tau$. Despite the appearance of other pitch extraction algorithms like modulation spectrum and harmonic product spectrum, the correlation method here is the preferred method thanks to its robustness and computational efficiency. However, it is noted that equation (1) is only one possible representation of a cross-correlation function and its application here does not impose a restriction of any kind to the method according to the invention. Cross-correlation can also be replaced by any cross-similarity measures such as generalized cross-correlation (GCC) or by the average magnitude difference function (AMDF).

FIG. 4 depicts an example of the cross-correlation function of a recording signal containing voiced speech. The cross-correlation function is calculated for different time-lag values $\tau$ which are plotted on the horizontal axis. The channels of the recording signal, e.g. the left channel 106 and the right channel 107 in FIG. 1, are cross-correlated and thus shifted with respect to each other in every possible way. The time-lag values $\tau$ applied to calculate the cross-correlation function in FIG. 4 range from $\tau$=-300 ms to $\tau$=300 ms. The shift that results in the highest correlation value and produces the so called 'main peak' 401 is the relative delay of one channel with respect to the other. The cross-correlation function produces a number of additional correlation peaks 402 which are caused by the wave-properties of a periodic audio signal. In addition to the main peak 401 there are K peaks on either side of the main peak. FIG. 4 therefore depicts 2K+1 (including the main peak) correlation peaks in all. In FIG. 4 the cross-correlation function for one frame of the recording signal is depicted. Two features of such a cross-correlation are well known and used in many different speaker-tracking methods.

As a first significant quantity, there is a specific distance $L_0$ between each correlation peak related to the inverse of the fundamental frequency or 'pitch' of the audio signal of the acoustic source. This distance is therefore called pitch-dependent correlation lag $L_0$. It can be calculated using the equation $$L_0(f_0) = \frac{F_s}{f_0}, \quad (2)$$

wherein $f_0$ denotes the pitch and $F_s$ is the sampling frequency applied during the recording procedure. With this equation it is possible to estimate the number of correlation peaks for each pitch candidate under consideration. Assuming that each sample has N sampling points, then for every pitch frequency $f_0$ the distance between the correlation peaks in the cross-correlation, calculated with equation (2), should be $L_0$ sampling points. Since the sample has N sampling points, up to K=floor[N/(2 $L_0$)] correlation peaks for each direction, positive and negative, can be considered.

The pitch-dependent correlation lag $L_0$ is used by traditional pitch-tracking methods to determine the pitch, however these methods apply auto-correlation functions on only one channel of a recording signal instead of a cross-correlation function from one or more channel pairs. Traditional methods identify the pitch from the distance between the origin, i.e. time-lag value $\tau$=0, and the first correlation peak of the auto correlation function.

Secondly, there is a correlation lag $O_0$ between the main peak 401 and the origin, corresponding to the cross-channel delay of a given periodicity, which is also encoded in the joint shift of all the other correlation peaks 402. In traditional location-detecting methods this information is used to determine the direction-of-arrival (DoA) of an audio signal, but only the shift of the main peak 401 is used for this purpose. Usually the DoA is given as the angle-of-arrival. The correlation lag is called DoA-dependent correlation lag $O_0$. It is calculated as $$O_0(\varphi_0) = \frac{d \cdot \cos(\varphi_0) \cdot F_s}{c}, \quad (3)$$

wherein $\varphi_0$ denotes the angle-of-arrival of the audio signal, d is the distance between the recording means, e.g. microphones or other sensors, and c is the speed of sound in the propagation medium. In most cases the propagation medium will be air, the speed of sound in air is c=341 ms$^{-1}$. The time-delay of arrival at the at least two microphones allows to identify the direction the audio signal comes from. FIG. 4 shows the cross-correlation for the recording signal of only one acoustic source, however the aforementioned observations easily generalize for the case of concurrent uncorrelated acoustic sources.

By evaluating the cross-correlation function it is possible to extract information on every acoustic source that contributes to the recording signal. The acoustic sources may have a number of different fundamental frequencies and may originate from many different directions. The method according to the invention proposes a sampling function to extract said information from multi-channel recording signals.

In order to properly account for a range of frequencies and possible geometries, the cross-correlation function has to be evaluated for different fundamental frequencies and different directions-of-arrival. In order to keep the computational efforts low, the cross-correlation function is evaluated only for a predefined range of pitch- and DoA-values. The pitch-candidates may range from 50 to 500 Hz, with a step-size of 1 Hz. This range could be further reduced if the scope of the evaluation was only on voices of a specific kind, such as male voices, which are known to have a pitch between 85 and 155 Hz. The DoA-candidates may range from 0° to 180°, with a step-size of 1°, for instance.

Every pitch-value corresponds to a specific pitch-dependent correlation lag $L_0$, and every DoA-value to a specific DoA-dependent correlation lag $O_0$. By evaluating a cross-correlation function for every combination of pitch- and DoA-values it should therefore be possible to extract the pitch and the DoA of the acoustic sources that have effectively contributed to the recorded signal.

The sampling function is calculated with the equation $$\rho_t(\varphi_0, f_0) = b \cdot \sum_{k=-K}^{K} R_1(\lfloor k \cdot L_0(f_0) + O_0(\varphi_0) \rfloor), \quad (4)$$

wherein b is a normalization factor, 2K+1 is the number of correlation peaks considered (i.e. K peaks on either side of the main peak and the main peak) and $R_t(\tau)$ is the cross-correlation function (according to equation (1)) for discrete time-lag values $\tau$. In order to obtain integers for the time-lag value $\tau$, the floor-function is employed, but any other rounding function would be suitable as well. Also interpolation between samples could be used. A symmetric interval is employed in the sum of equation (4), including all correlation peaks from −K to K. However other intervals could be employed as well, e.g. an asymmetric interval running from a first correlation peak $-K_1$ to a second correlation peak $K_2$. It is even possible to replace the sum with a product of the cross-correlation functions for all time-lag values $\tau$ or even with the sum of all squares of these values. Furthermore there are different ways of dealing with negative values of the cross-correlation function, like omitting them from the sum or calculating the square, for instance. The normalization factor can have different values, it might even be omitted (b=1), however in the present case it is set to b=1/(2K+1).

By calculating the sampling function (4), a matrix $\rho_t(\varphi_0, f_0)$ results for every time-frame. A value is assigned to every point of the position-pitch plane which is spanned by the pitch-values and the DoA-values. Position here relates to DoA, more precisely to angle-of-arrival. The maxima of said values indicate acoustic sources which can be identified by respective pitch- and DoA-values.

Figure 5:
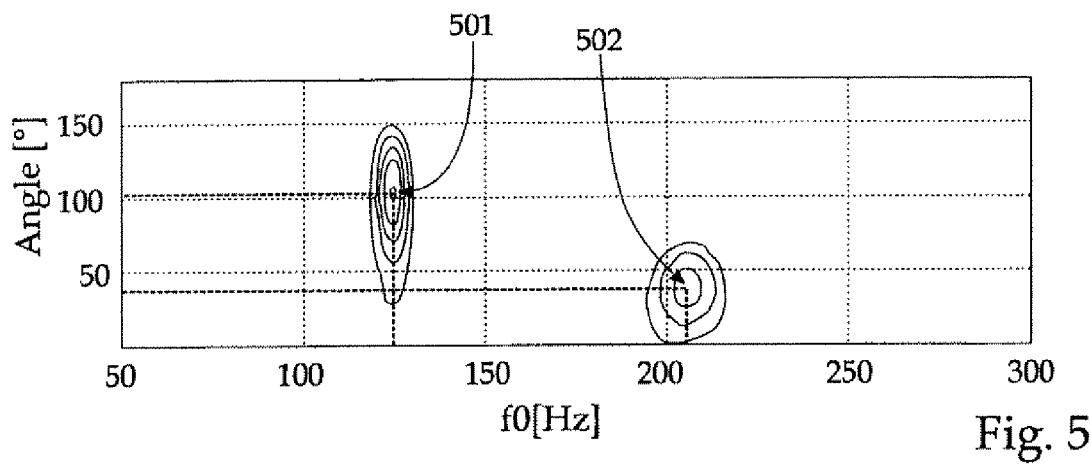
Figure 6A:
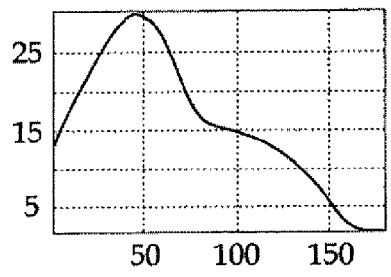
Figure 6B:
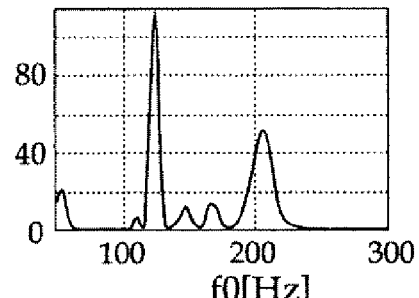

FIG. 5 shows an example of a position-pitch plane with two sources. A first source 501 has a pitch of approximately 125 Hz and an angle-of-arrival of approximately 100°, a second source 502 with a pitch of about 205 Hz has an angle-of-arrival of approximately 40°. FIGS. 6a and 6b show projections of the position-pitch plane onto the position-axis (FIG. 6a) and the pitch-axis (FIG. 6b). Both projections confirm the assumptions being made on position and pitch of the sources in FIG. 5. The width of peaks here depends on the length of the analysis segment (i.e. the length of the frame) and on how stable the pitch of the source is during the analysis segment, the height is defined by the spatial stability of the source, the number of microphone pairs employed, microphone spacing and formant positions.

The position-pitch plane is an intuitive model that holds relevant cues of the acoustic scene, and its derivation is based on the fact that cross-correlation functions not only extract common periodicities from signals, but also encode the cross-channel delay related to those periodicities. By extracting the position-pitch plane over time and searching the objects through the evolution of this plane, clear semi-continuous trajectories can be tracked representing persons speaking while moving. In case the voicing is interrupted while a speaker is moving, his position can be re-initialized, based on his pitch-value and the position of the other acoustic sources.

The power of the position-pitch plane lies not only in the two-dimensional decomposition of pitch and DoA, but also that it 'restores' noisy correlation main peaks that would give imprecise pitch or DoA-values, achieved by collecting the information hidden also in all the side lobes of a particular cross-correlation function. Furthermore, while originally concurrent speakers would show up in an overlapping main peak in the cross-correlation function, the method according to the invention enables separating concurrent speakers into a multidimensional representation. Moreover it provides enhanced noise-robustness to the method.

Figure 7:
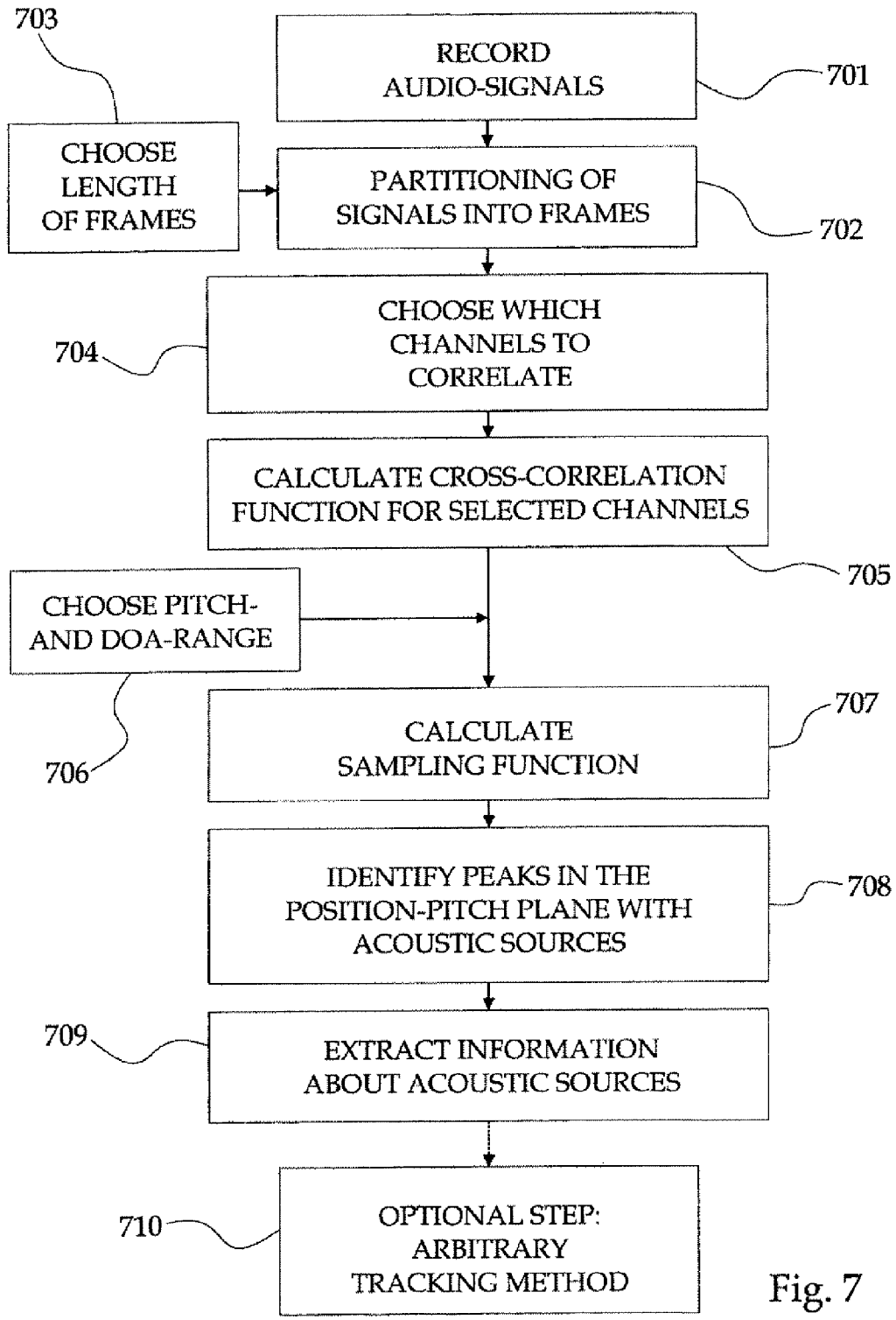

The method according to the invention is illustrated in the flow-diagram of FIG. 7. At step 701, a set of at least two recording means records the audio signals emitted by acoustic sources. Preferably, a sampling frequency of 16 kHz or more is applied. Step 701 produces a stereo- or multi-channel recording signal that is further processed. In a step 702 the recording signal is partitioned into frames of predefined length, wherein the length of the frames is chosen in a step 703. Usually the length of the frames is between 20 ms and 200 ms. In case the acoustic sources are known to be immobile or moving slowly and to have a quasi-constant pitch, it is possible to extend the length of the frames to more than a second, to gain more information for each frame.

From the set of channels from the recording signal, pairs of channels are selected in a step 704. For said channels, cross-correlation functions are calculated in a step 705 for a plurality of time-lag values.

The cross-correlation function is analyzed to extract information on acoustic sources from the recording signal. Sets of pitch- and DoA-candidates are chosen in a step 706. Such sets may range from 50 Hz to 500 Hz for pitch and from 0° to 180° for DoA, with a step-size of 1 Hz and 1°, respectively.

For said pitch- and DoA-candidates, the cross-correlation function is sampled by calculating a sampling function, e.g. the one of equation (4), in a step 707. The sampling function produces a value for each point of a position-pitch plane which is spanned by the pitch- and DoA-candidates. Acoustic sources are identified with peaks in said position-pitch plane (step 708).

From these peaks, information for every acoustic sources can be extracted in a step 709. In this particular case, the information would contain pitch and angle-of-arrival for each source. The derivation of these data is done by methods well-known in the art. By pursuing the evolution of the peaks in the position-pitch plane over time, clear semi-continuous trajectories can be tracked representing moving acoustic sources.

Equivalently, the sampling function of equation (4) can be expressed in terms of the cross spectrum as $S_{xy}(e^{j\omega})$, which is the Fourier transform of the cross-correlation function of equation (1). The sampling function then evaluates as $$\rho_t(\varphi_0, f_0) = \sum_{k=0}^{\lfloor \frac{\pi}{\Omega} \rfloor} |S_{xy}(e^{jk\Omega})| \cdot \cos(\angle S_{xy}(e^{jk\Omega}) + k\Omega O_0(\varphi_0)), \quad (5)$$

wherein $\Omega(f_0)=2\pi f_0/F_s$, the magnitude response $|S_{xy}(e^{j\omega})|$ holds the harmonic structure of the recorded signals while the phase response $\angle S_{xy}(e^{j\omega})$ encodes the delay of signals occurring between two microphones. With $f_0$ and $\phi_0$ running through a predefined range as described in step 706, the position-pitch plane $\rho_t(\phi_0, f_0)$ yields peaks for acoustic sources within said range. Equation (5) is only one possible expression of the sampling function in terms of the cross spectrum, generalizations might be possible too. In particular, the cosine function might be replaced by a more general function which could be any real valued, even and $2\pi$-periodic function.

In principle, the computation in the frequency domain could be explained with a flow-diagram as set forth in FIG. 7, however minor changes would be necessary. After the calculation of the cross-correlation function in step 705, step 707 is modified in the following way: The Fourier transform of the cross-correlation function is calculated, yielding the cross spectrum $S_{xy}(e^{j\omega})$. The cross spectrum is sampled at frequency $\Omega$ and multiples of it to obtain all values necessary to compute equation (5). Equation (5) is then computed.

The representation of position and pitch information of acoustic sources as proposed in the present invention makes it possible to track position and pitch in a joint way, i.e. the pitch value of each source can be linked to the physical position of the source. This joint tracking assigns a pitch-based ID to each acoustic source, which can be used to solve various problems. Therefore in an optional step 710, the information extracted in step 709 can be used as input for an arbitrary tracking method: Spatial tracking and pitch tracking of multiple acoustic sources can be simplified, also additional cues for spectral masking-based source separation of multiple sources are available as well as additional cues for the permutation problem of Independent Component Analysis; further beamforming methods can be improved.

The invention improves spatial tracking of acoustic sources, e.g. the reinitialization of the position tracking algorithm after a source was temporarily passive. This can be done by collecting a histogram of the pitch distribution from a given source ID and reassigning the pitch-based ID to the position by using a maximum-likelihood method. The method can also be used for reinitializing pitch tracking after abrupt changes of pitch. Since the proposed method provides position as an extra cue, the pitch tracking becomes more robust. The pitch tracking algorithm is reinitialized by the new pitch value corresponding to the most probable position of the source at a given point of time.

In spectral masking methods, spectrograms of audio signals are analyzed to extract information about the acoustic sources producing the audio signal. Spectral masking methods follow selected trajectories over time while suppressing other signals. Difficulties arise when an acoustic source is mute for a while or changes pitch abruptly, since the speech model used in such spectral masking methods is often based on pitch which is ambiguous in multi-source environments. Prior knowledge of pitch in combination with position, coming from the method according to the invention, can enhance such a pitch-driven spectral masking method.

Frequency domain Independent Component Analysis (ICA) is a famous method which separates mixed sources by unmixing several frequency channel by its own into separated channels without having knowledge about which separated channel belongs to which source. This results in uncertainty about the assignment of different frequency channels to a given source. It is known that unmixing filters obtained for each frequency channel by ICA exhibit a spatial selectivity, each filter emphasizing one direction corresponding to one acoustic source. The known DoA information obtained by the method according to the invention can guide the identification and linkage of unmixing filters with the same DoA selectivity across all frequency channels. Further, the estimated evolution of pitch trajectories obtained by the proposed method supports the evaluation of channel assignments. A correct assembly of unmixed frequency channels should result in a source signal having the same evolution of pitch as the estimated one. Principally, DoA based guidance is easier for high frequency channels, while pitch based guidance is easier for low frequency channels.

We claim:

1. Method for localizing and tracking acoustic sources (101) in a multi-source environment, comprising the following steps:
    (a) recording of audio-signals (103) of at least one acoustic source (101) with at least two recording means (104, 105), creating a two- or multi-channel recording signal;
    (b) partitioning said recording signal into frames of predefined length (N);
    (c) calculating for each frame a cross-correlation function as a function of discrete time-lag values ($\tau$) for channel pairs (106, 107) of the recording signal;
    (d) evaluating the cross-correlation function by calculating a sampling function depending on a pitch parameter ($f_0$) and at least one spatial parameter ($\phi_0$), the sampling function assigning a value to every point of a multidimensional space being spanned by the pitch-parameter and the spatial parameters, said sampling function being obtained by collecting values of the cross-correlation function for a set of discrete time-lag values determined for each point in the multidimensional space;
    (e) identifying peaks in said multidimensional space with respective acoustic sources in the multi-source environment.

2. Method of claim 1, wherein in step (a) a plurality of pairs of recording means (104, 105, 202, 302) are used for recording the audio signals (103).

3. Method of claim 2, wherein the recording means (302) are spatially arranged in a circular array.

4. Method of claim 1, wherein in step (a) the recording means (202) are spatially arranged as a linear array.

5. Method of claim 1, wherein in step (a) the recording of audio-signals (103) is performed with recording means (104, 105) applying a sampling rate of at least 16 kHz and higher.

6. Method of claim 1, wherein in step (b) the predefined length of the frames ranges from 20 to 200 ms.

7. Method of claim 1, wherein in step (b) the predefined length of the frames is above 1 s, provided the acoustic sources are immobile and their pitch remains quasi-constant.

8. Method of claim 1, wherein in step (c) the cross-correlation function is calculated using the equation $$R_1(\tau) = \sum_{n=-N/2}^{N/2} x_1(tN+n) \cdot x_2(tN+n+\tau),$$

wherein $x_1$ and $x_2$ denote a first channel (106) of the recording signal and a second channel (107) of the recording signal, t denotes a frame index, N denotes the length of the frame, and $\tau$ is the discrete time lag.

9. Method of claim 1, wherein in step (d) the pitch-parameter is identified with the fundamental frequency of an acoustic source.

10. Method of claim 1, wherein in step (d) one spatial parameter is identified with the angle-of-arrival ($\phi$) of the signal.

11. Method of claim 1, wherein in step (d) the sampling function is calculated for a set of predefined values of the pitch parameter ($f_0$) and the spatial parameters ($\phi_0$).

12. Method of claim 1, wherein in step (d) the number of discrete time-lag values ($\tau$) of the set of discrete time-lag values ($\tau$) depends on the number of correlation peaks (402) of the cross-correlation function being considered, said number of correlation peaks depending on the pitch value under consideration.

13. Method of claim 12, wherein one spatial parameter is the angle-of-arrival of the audio signal and each of the time-lag values ($\tau$) is determined for a peak of the cross-correlation function by the equation $\tau = k \cdot L(f_0) + O(\phi_0)$, wherein k is the number of the correlation peak, $L(f_0)$ is a first time lag depending on the pitch-parameter, calculated by dividing the sampling frequency $F_s$ by the pitch-parameter $f_0$ of the point in the multidimensional space the cross-correlation function is evaluated for, and $O(\phi_0)$ denotes a second time lag depending on the angle-of-arrival of the point in the multidimensional space the cross-correlation function is evaluated for, calculated with the equation:

$$O(\varphi_0) = \frac{d \cdot \cos(\varphi_0) \cdot F_s}{c},$$

wherein d denotes the distance between the recording means used for obtaining the channel pairs for the calculation of the cross-correlation function, $\phi_0$ denotes the angle of arrival of the audio signal as spatial parameter and c denotes the speed of sound in the propagation medium.

14. Method of claim 1, wherein the collecting of values of the cross-correlation function of step (d) comprises an operation chosen from the group of summation of values of the cross-correlation function, summation of the squares of values of the cross-correlation function and the product of values of the cross correlation function.

15. Method of claim 1, wherein in step (d) the sampling function is calculated using the equation $$\rho_t(\varphi_0, f_0) = b \cdot \sum_{k=-K}^{K} R_t(\lfloor k \cdot L_0(f_0) + O(\varphi_0) \rfloor),$$

wherein $\phi_0$ signifies the angle of arrival as a spatial parameter, $f_0$ denotes the pitch, b denotes a normalization factor and $R_t$ is the cross-correlation function and the time-lag value $\tau$ is rounded employing the floor function.

16. Method of claim 15, wherein the floor function is replaced by another rounding mechanism.

17. Method of claim 1, wherein in step (d) the Fourier-transform of the cross-correlation function is calculated and the computation of the sampling function is conducted in the frequency domain.

18. Method of claim 1, wherein in step (e) by identifying the peaks (501, 502) each acoustic source can be assigned a pitch parameter and at least one spatial parameter.

19. Method of claim 18, wherein by combining the results of a sequence of frames the time-evolution of acoustic sources is tracked.

20. Method of claim 1, wherein the results from step (e) are used as input for source-tracking methods, source-localization methods and/or source-separation methods such as Independent Component Analysis (ICA), direction-sensitive recording by applying beam-forming or spectral masking methods.

* * * * *